United States Patent [19]

Kuhl

[11] Patent Number: 4,481,056
[45] Date of Patent: Nov. 6, 1984

[54] PROCESS FOR CONTINUOUS PRODUCTION OF SHAPED BODIES OF SYNTHETIC RESIN REINFORCED WITH AXIALLY PARALLEL FIBERS

[75] Inventor: Martin Kuhl, Selb, Fed. Rep. of Germany

[73] Assignee: Rosenthal Technik AG, Selb, Fed. Rep. of Germany

[21] Appl. No.: 376,952

[22] Filed: May 11, 1982

[30] Foreign Application Priority Data

Jul. 24, 1981 [EP] European Pat. Off. ... EP81105857.7

[51] Int. Cl.$^3$ ............................ B32B 5/02; G32B 5/12
[52] U.S. Cl. .................................... 156/180; 156/441; 174/178
[58] Field of Search ............... 156/180, 166, 433, 441, 156/498, 322, 428, 432; 264/137, 158, 263; 118/405, 420, DIG. 18, 125; 174/179, 178

[56] References Cited

U.S. PATENT DOCUMENTS

| | | | |
|---|---|---|---|
| 2,684,318 | 7/1954 | Meek | 156/180 |
| 2,997,529 | 8/1961 | Fink | 174/179 |
| 3,235,429 | 2/1966 | Boggs | 156/441 |
| 3,470,051 | 9/1969 | Meyer | 156/180 |
| 3,715,254 | 2/1973 | Tolgyesi | 156/180 |

Primary Examiner—Michael Ball
Attorney, Agent, or Firm—Schwartz, Jeffery, Schwaab, Mack, Blumenthal & Koch

[57] ABSTRACT

A process for continuous production of shaped bodies of synthetic resin reinforced with axially parallel fibers wherein a plurality of continuous fibers are drawn through spaced apertures in a perforated guide plate and then through an alternating series of impregnating baths and shaping nozzles and finally through a hardening zone. The impregnating baths, shaping nozzles, and drying zone are disposed in a vertical arrangement, the shaped body withdrawn from one shaping nozzle is passed with a further group of fibers through the next resin impregnating bath and shaping nozzle, the impregnating resin on the surface of the shaped body is still liquid as it enters the next impregnating bath and all of the impregnating baths and the drying zone are maintained at the same temperature. The resulting fiber-reinforced shaped synthetic resin bodies are particularly suitable as electrical insulators which also exhibit good mechanical strength and which are especially useful in high voltage installations.

10 Claims, 4 Drawing Figures

PROCESS FOR CONTINUOUS PRODUCTION OF SHAPED BODIES OF SYNTHETIC RESIN REINFORCED WITH AXIALLY PARALLEL FIBERS

BACKGROUND OF THE INVENTION

The present invention relates to a process for the continuous production of axially parallel fiber reinforced synthetic plastic shapes. More particularly, the invention relates to production of fiber-reinforced round rods having large cross sections and high quality for use in high-voltage technology, wherein fibers are drawn from spools, passed through perforated plates, impregnated in suitable installations with a resin, shaped by means of nozzles, and hardened into solid shapes in a hardening furnace. For use in high-voltage technology, shaped synthetic plastic bodies of this type must be able to simultaneously withstand both high electrical stresses and large mechanical forces. Mechanical strength of the synthetic plastic shapes is obtained in particular by means of the axially parallel orientation of the reinforcing fibers, which ordinarily amount to from 40 to 75 volume percent of the shaped body. Glass fibers are used for the most part, but other organic or inorganic fibers may be employed.

Processes of this general type are known. An installation is described in German Auslegeschrift No. 1 264 742, in which the hardening line comprises three successive furnaces. A nozzle is located in front of each furnace, and the diameters of the nozzles decrease toward the end of the line. The nozzles are intended to shape the cross section of the shaped body. Excess resin is squeezed out from between the fibers during the process. However, with thick-walled shapes only the outer range of the fiber matrix is compressed, and the resin seeks an outlet transversely to the axis of the shaped body, by breaking out laterally from the body. The result is a poor distribution of the glass fibers, particularly in the case of thicker round rods. Furthermore, during the solidification of the shaped body, the nozzles tear the sensitive surfaces, whereby cracks are produced again.

It is a fundamental principle that in high-voltage technology only insulating parts which do not contain any internal inhomogeneities such as air bubbles, cavities and cracks, can be used. When a high voltage is applied to the shaped body, such inhomogeneities lead to a partial internal discharge, which could lead to an extended electrical breakdown. Such a breakdown may also result in the mechanical failure of the insulating body.

Inhomogeneities of this type may originate in various stages of the production process, for example in an inadequate saturation of the fibers whereby air bubble are drawn into the shaped body. On the other hand, during shaping by means of draw nozzles, the impregnating resin may be caused to bake onto the wall of the shape. This results in cracking on the surface of the shape. Particularly when highly active impregnating resins are used or when thick walled shapes are formed, there is a risk that the reaction heat generated cannot be removed rapidly enough, which leads to shrinkage cracking in the shaped body.

Another problem arises in connection with the distribution of the fibers over the cross section of the shaped body. Irregular fiber distributions lead to internal stresses and thus to low mechanical properties of the shaped bodies and favor generation of shrinkage cracking inside the shaped body. Especially in the manufacture of round rods having diameters greater than 3 cm, the distribution of fibers plays an important role. Similarly, high tensile stresses must be avoided during the manufacturing process, since the impregnating resin tends to shrink three-dimensionally during hardening. High tensile stresses in the direction of the axis of the shaped body interfere with the axial shrinkage of the impregnating resin, again causing the shape to crack.

SUMMARY OF THE INVENTION

Accordingly, it is the object of the present invention to provide an improved process for producing fiber-reinforced shaped bodies of synthetic resin.

Another object of the present invention is to provide a process capable of producing fiber-reinforced shaped synthetic resin bodies which are substantially free of internal non-homogeneities such as air bubbles, voids and/or cracks.

An additional object of the present invention is to provide a process capable of producing fiber-reinforced shaped synthetic resin bodies having various cross-sectional configurations.

A further object of the present invention is to provide a process particularly suitable for producing round fiber-reinforced synthetic resin bodies having diameters greater than 3 cm.

It is also an object of the present invention to provide a process for producing relatively thick-walled fiber reinforced synthetic resin shapes.

Yet another object of the present invention is to provide a process for producing fiber-reinforced shaped synthetic resin bodies exhibiting good mechanical strength.

A still further object of the present invention is to provide a process for producing fiber-reinforced shaped synthetic resin bodies having a substantially regular distribution of the reinforcing fibers.

Another object of the present invention is to provide a process for producing fiber-reinforced shaped synthetic resin bodies which avoids subjecting the shaped bodies to excessive tensile stress.

Additionally, it is an object of the present invention to provide fiber-reinforced shaped synthetic resin bodies suitable for use as high voltage insulators and the like.

These and other objects of the invention are achieved by providing a process for continuous production of shaped bodies of synthetic resin reinforced with axially parallel fibers comprising the steps of drawing a plurality of fibers through spaced apertures in a perforated guide plate; drawing a first portion of said fibers vertically through a first means for impregnating fibers with a synthetic resin and impregnating said first fiber portion with a synthetic resin therein; drawing the resin impregnated fibers vertically through a first nozzle to form the resin impregnated fiber portion to a desired first shape in which the resin is still liquid at the surface thereof; drawing the shaped body from the preceding nozzle and an additional portion of said fibers vertically through a further resin impregnating means maintained at the same temperature as said first impregnating means and impregnating said additional fiber portion with a synthetic resin therein; drawing the shape and the resin impregnated additional fibers from said further impregnating means through a further nozzle to form the shaped body and the resin impregnated additional fiber portion to a further desired shape in which the resin is still liquid at the surface thereof; repeating the preceding two steps a selected number of times, and drawing the desired shape from the final nozzle vertically through a hardening zone disposed immediately following the final nozzle and maintained at the same temperature as the resin impregnating means and hardening the final shape therein; said perforated guide plate, said resin impregnating means, said nozzles and said hardening zone being disposed in vertical arrangement; whereby the final shaped body is formed as a series of individually impregnated and successively assembled cross-sectional segments beginning with a central core and proceeding to the outer surface.

Round rods of this type are needed, for example, in manufacturing compound high-voltage synthetic resin insulators, as switch rods and ground rods in high-voltage switch gear and installations, as antenna insulators, and as supports for the winding in high voltage transformers. The heart of the invention lies in the arrangement and configuration of the impregnating baths. The vertical arrangement of impregnating baths, the hardening line and the drawing installation results in significant advantages for the apparatus with respect to the quality of the shaped bodies made. The fibers entering the impregnating baths vertically may be manipulated more easily than in horizontal installations, since the impregnating resin is able to penetrate the fibers by capillary action, as the result of the slight distances between the individual fibers, without the generation of air bubbles. Deformation of the shaped bodies is also prevented by the vertical arrangement of the installation. Tensile forces applied by the drawing apparatus are correspondingly lower, since the friction of the fibers in the impregnating baths is very low. Because the impregnated shaped bodies leave the impregnating bath with the resin still in the liquid state, the impregnating resin does not adhere to the nozzle.

In the interest of achieving a rapid production rate, the impregnation and the hardening process should be effected as rapidly as possible. This goal may be attained by keeping the viscosity of the impregnating resin as low as possible, i.e., the temperature of the impregnating resin should be as high as feasible. However, at elevated temperatures, the impregnating resin tends to harden rapidly. To counteract this tendency, the volume of the impregnating bath should be kept as small as possible, so that the chemical reaction or hardening of the impregnating resin does not take place in the bath itself.

If very many fibers are introduced in an impregnating bath, it is difficult to maintain a constant temperature over the cross section of the bath. It is only possible to introduce thermal energy into the impregnating bath through the wall of its vessel, but this leads to the risk that the temperature in the center of larger baths will decrease slightly. The viscosity of the resin will then increase in the center, and the fibers will not be saturated cleanly. On the other hand, if the overall cross section of the shaped body is divided into smaller annular segments, the impregnating baths may be small in size and uniform bath temperatures can be maintained. It is then possible to operate with high temperatures and low resin viscosities.

When the first cross-sectional segment or initial shape leaves the first impregnation bath and enters the second impregnating bath, the temperature of the first cross-sectional segment is preferably the same as the temperature of the second bath. The initial hardening of the impregnating resin may now occur in the first segment, but as the segment is small, no high exothermic reaction temperature is to be expected. The exothermic heat is conducted in part into the impregnating bath for impregnating the next cross-sectional segment. That is to say, the successively arranged impregnating baths act as cooling baths for the previously shaped cross-sectional segments. In this manner, in contrast to processes heretofore known, the exothermic temperature peak which occurs in the known processes is dispersed into individual, lower temperature peaks offset in time with respect to each other, which in addition are being cooled. Furthermore, there are no problems in joining of the individual cross-sectional segments, since the segments are still liquid at the time of their mutual contact. The temperature peak of the cross-sectional segments may also be affected by the distance of the impregnating baths from each other and by the dimensions of the cross-sectional segments.

Satisfactory distribution of the fibers in the shaped body is assured, because the resin body is shaped only once, with all of the excess resin being forced back into the impregnating baths, i.e., there is no resin flow perpendicularly to the longitudinal axis of the shaped body. The impregnating baths are preferably all maintained at the same temperature, so that a uniform distribution of temperature is assured throughout the cross section of the shaped body, thereby preventing the appearance of residual stresses in the shaped body. In order to avoid interference with this temperature distribution, it is also appropriate to maintain the temperature of the subsequent hardening zone at the same temperature as the impregnating baths. The use of hot air in the hardening zone serves the same function as the successive impregnating baths of equal temperature. The air flowing around the shaped body has a cooling effect on the body.

BRIEF DESCRIPTION OF THE DRAWINGS

Further details of the invention will be explained with reference to the accompanying drawings, wherein.

DETAILED DESCRIPTION OF A PREFERRED EMBODIMENT

Figure 1:
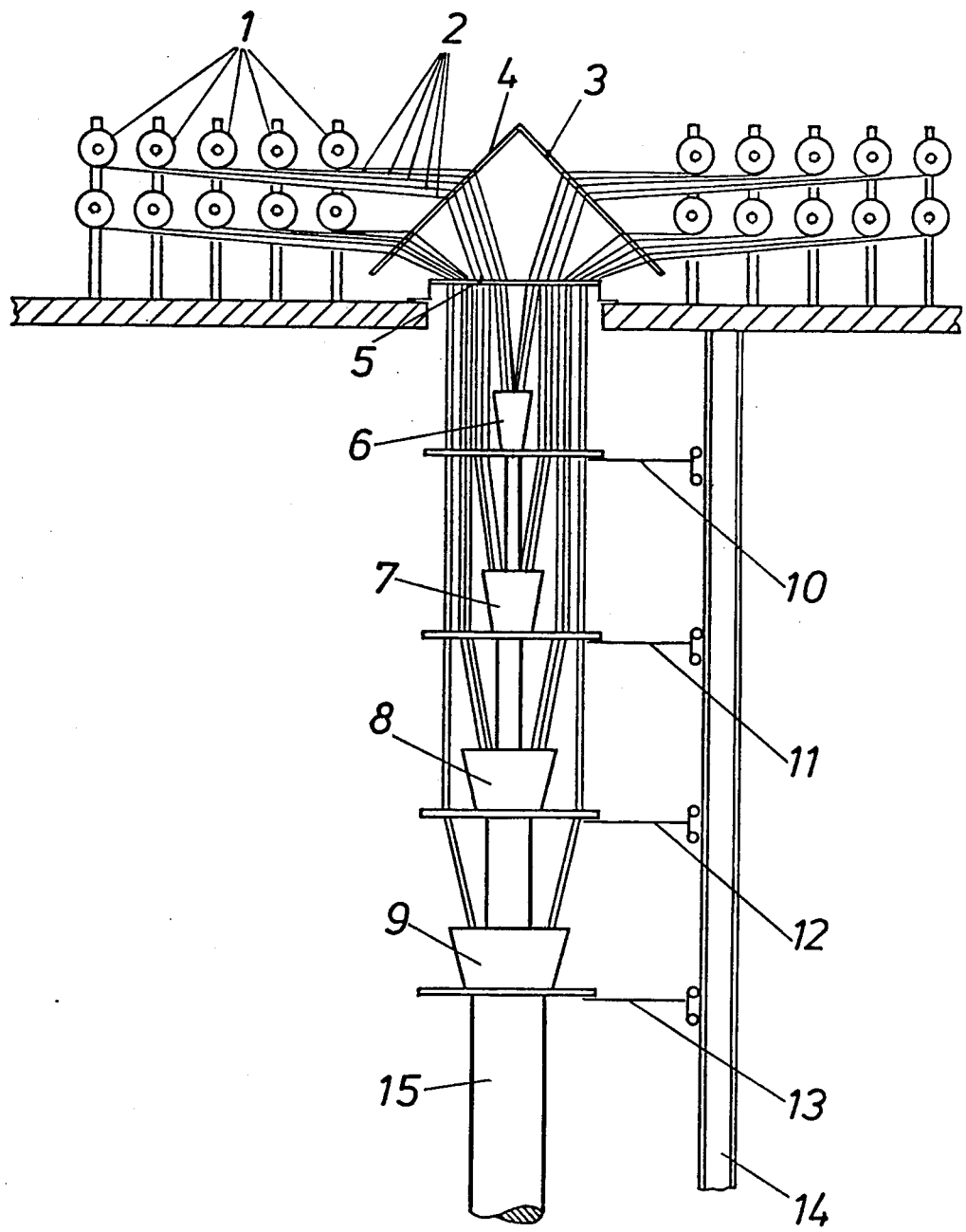
FIG. 1 is a schematic representation of the upper part of an impregnating and shaping installation.

FIG. 1 shows schematically the upper part of an installation for carrying out the process of the invention. The spools 1, upon which continuous fibers are wound, are placed on racks. The fibers 2 are distributed by means of perforated plates, 3, 4 and 5 so that the fibers are guided concentrically into the impregnating baths 6, 7, 8 and 9, which are disposed in vertical arrangement beneath each other. Initially, a first portion of the fibers 2 are impregnated in the impregnation bath 6 to form the center segment 33 of shaped body 15 (seen more clearly in FIG. 4) followed in succession by additional fiber portions to form the further cross-sectional segments 34, 35, 36, 37 and 38 of the shaped body. Impregnating baths 6, 7, 8 and 9 are mounted on plates 10, 11, 12, 13, which in turn are secured adjustably with respect to each other, to a common slide rail 14. The distance between successive impregnating baths preferably is from 200 mm to 2000 mm.

Figure 2:
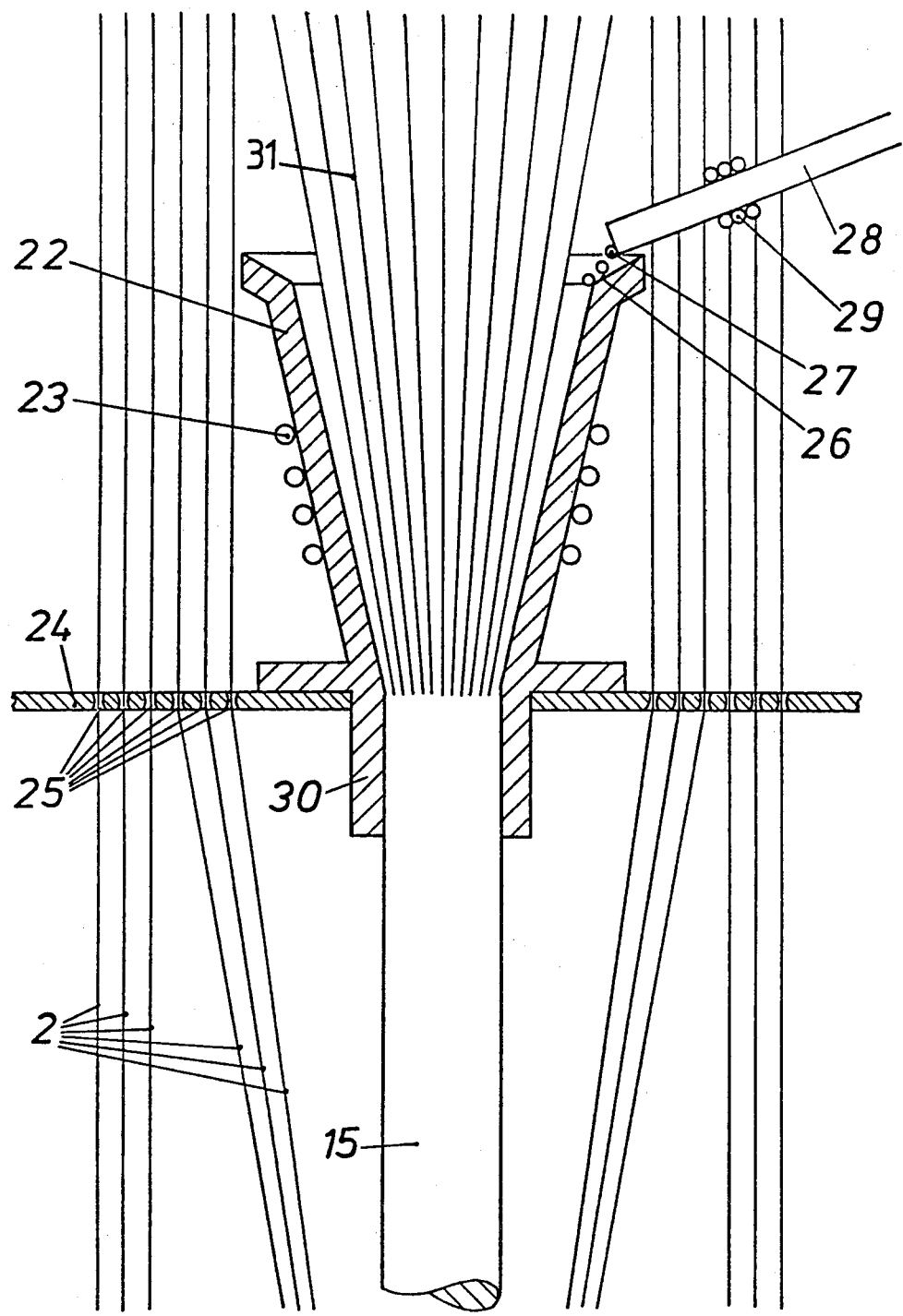
FIG. 2 is a detailed vertical sectional view of an impregnating bath.

In FIG. 2, an impregnating bath 22 for impregnating the center segment of the shaped body 15 is shown in cross section, as an example. The funnel-shaped impregnating bath 22 is equipped with heating means 23. Impregnating baths 6, 7, 8 and 9 are conveniently operated at a temperature between 30° C. and 180° C. It is advantageous and appropriate to maintain all of the impregnating baths 6, 7, 8 and 9 at the same temperature within control accuracies of for example 90°±5° C. Impregnating bath 22 is mounted on a plate 24, which simultaneously serves as the filament guide 25 for additional portions of the fibers 2 running toward the further impregnating baths located underneath impregnating bath 22. Impregnating bath 22 is provided at its upper margin with a surface 26 inclined toward the center of the bath, upon which drops of preheated impregnating resin 27 are dispensed. The final temperature of the impregnating bath is established by means of heat transfer from the impregnating bath to the resin droplets. The impregnating resin 27 is transported from a storage reservoir (not shown) by means of pumps or the like, through a pipe 28 to the impregnating bath 22. Pipe 28 is equipped with a heater 29.

The lower orifice or outlet opening of impregnating bath 22 simultaneously serves as the shaping nozzle 30, and gives the cross-sectional segment of the shaped body its desired form and dimension. The impregnating bath 22 and the filament guides 25 are arranged according to the desired contour of the shaped body. For example, in the case of a round rod, the inner surface of the impregnating bath 22 has the configuration of a truncated cone, and the filament guides 25 are arranged in concentric circles around the impregnating bath. In the case of a rectangle, on the other hand, the inner contour of the impregnating bath 22 has the configuration of a truncated pyramid and the filament guides 25 are arranged in concentric annular rectangles. In order to ensure accurate control of the temperature in the impregnating baths, it may be appropriate to preheat the fibers 2 immediately prior to their entry into the impregnating baths, 6, 7, 8 or 9. Hot air or radiators may be used for this purpose.

The division of the resin body cross section into individual segments 33–38 which are impregnated independently of each other depends on the overall cross section and the compactness of the shaped body 15. Thin walled "U" and "T" shapes need not be divided into cross-sectional segments, whereas division into individual segments is necessary in the case of round and square rods having larger cross sections. It is advantageous to dimension the partial segments so that the cross section of the center segment is, for example, doubled with respect to the cross section of the surrounding segment.

Figure 3:
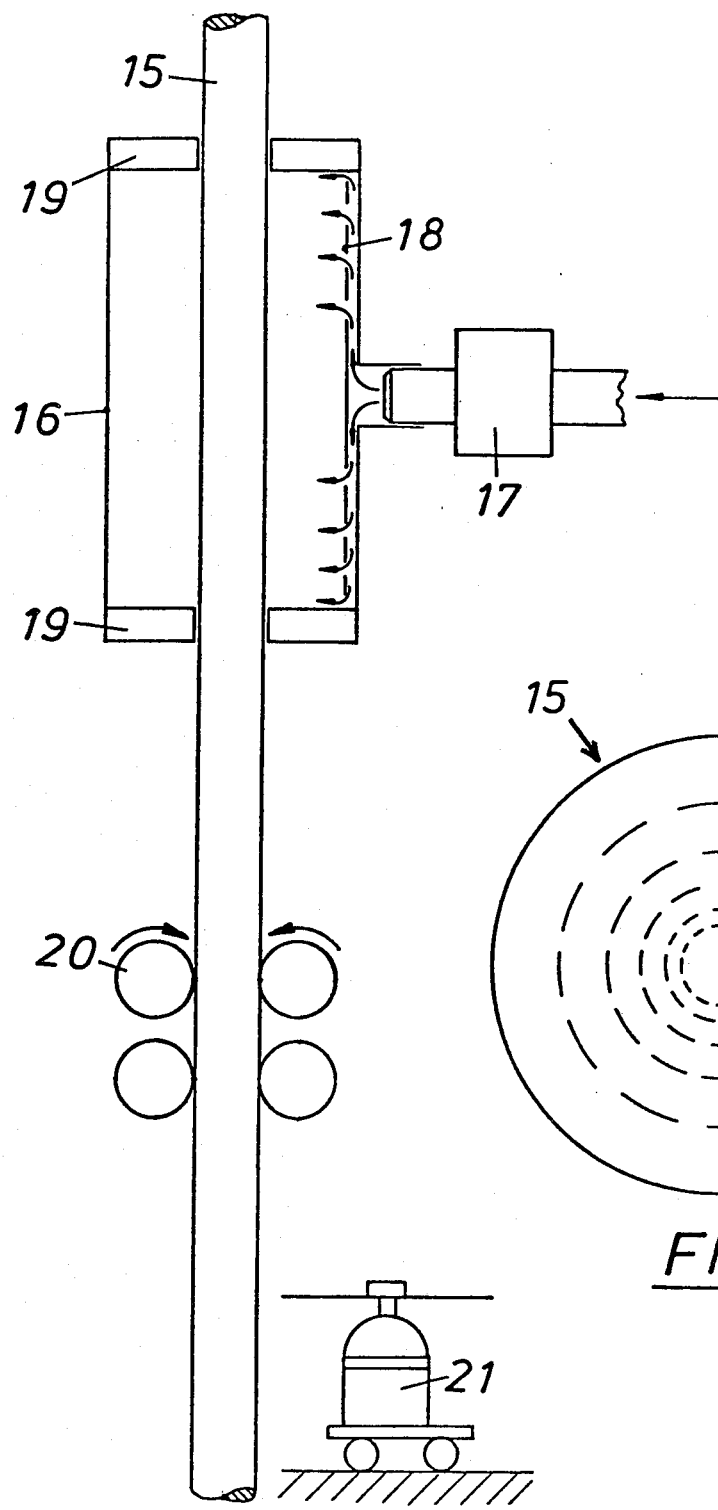
FIG. 3 is a schematic representation of the lower part of an impregnating and shaping installation showing the hardening zone and the drawing means.

FIG. 3 illustrates the lower part of an apparatus for carrying out the process of the invention. The completely impregnated shape 15 emanates from the lowermost impregnating bath 9 (see FIG. 1) into the hardening zone 16. In the illustrated embodiment, hardening zone 16 is an oven comprising a sheet metal housing into which air heated by a heater 17 is introduced. The heated air is uniformly distributed throughout hardening zone 16 by means of perforated plates 18. The heater is equipped with variable power controls and with valves permitting continuous supply of fresh air. The top and bottom ends of the sheet metal housing of hardening zone 16 are closed off by covers 19 provided with central openings for the entry and exit of the shaped body 15; said openings being slightly larger than the dimensions of the shaped body. Hot air blown into the hardening zone may escape from the hardening zone through the gaps between the shaped body and the covers 19 so that no overpressure is established in hardening zone 16. These measures make it possible to operate hardening zone 16 at a temperature which is uniform over its entire length and which corresponds to the temperature of the impregnating baths 6, 7, 8 and 9. The fully hardened shaped body leaves the hardening zone 16 and is transported vertically downwardly by a drive 20. The drive or drawing apparatus 20 preferably is equipped with controls for varying its rotational speed (rpm). Due to the low friction forces encountered during the manufacture of the shaped body, two driven rolls rotating in opposite directions are adequate as a withdrawing or drive means. A crawler thread drive may be required for very heavy shaped bodies. The finished shape 15 may be cut into the desired lengths by means of a saw 21, which advances at the same speed as the shaped body.

Figure 4:
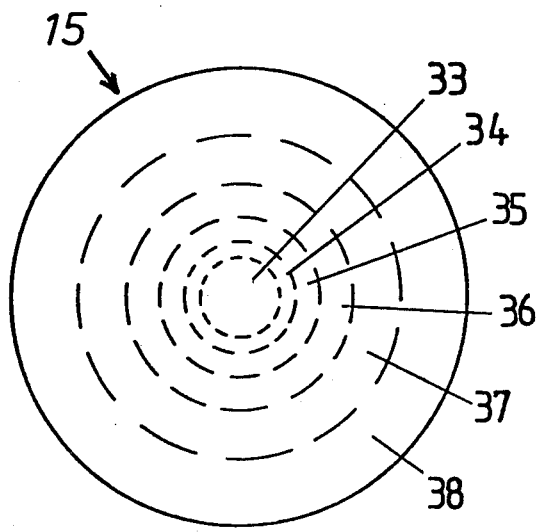
FIG. 4 is an end view of a shaped body produced according to the invention with six individual cross-sectional segments.

FIG. 4 shows cross-sectional segments 33 to 38 of a shaped body 15 produced according to the invention. The segments contain reinforcing fibers in a proportion of 40 to 75 volume percent. Known fibers may be used as the fiber material. For example, glass fibers made from an aluminoborosilicate glass, fibers of saturated polyesters like those made from isophthalic acid and aliphatic diols, polyamid fibers of E-caprolactam or aromatic polyamides may be used in the form of rovings, yarn, thread, strips or any other type of semi-finished product. The fibers may or may not be surface treated, depending on the impregnating resin.

Known molding and impregnating resins may be used for impregnation. Resins which are well suited for use in the process of the invention include, for example, epoxy resins formed from bisphenol A, hexahydrophthalic acid, bisphenol F, hydantoins, aniline as well as epoxidized olefins and novolaks, processed with dicarboxylic acid anhydrides, aliphatic or aromatic amines or polyamines, as well as aminoamides or -imides. Epoxy compounds of other chemical types or different hardeners may also be used.

Unsaturated polyester resins, such as those formed of adipic or fumaric acid and diols or glycols, dissolved in styrene monomer or acrylate monomer are also useful. Reactive resins of other chemical types, such as polyamides, polyurethanes and monomeric methacrylic acid esters, may also be used.

The reactive resin mixtures and the fibers are chosen depending on the desired properties of the shaped bodies, i.e., depending on the conditions under which the shaped body is to be used. The properties of the shaped bodies may also be affected in a controlled manner by incorporating specific additives in the reactive mixture such as accelerators, activators, flexibility enhancers, plasticizers or pigments.

Further details of the invention will be apparent from a consideration of the following non-limiting example.

EXAMPLE

The production of a round rod, for example having a diameter of 72 mm, is illustrated by the following example:

Initially, the viscosity and reactivity of the impregnating resin are determined; this sets the processing temperature of the resin. In a preliminary experiment, the size of the central cross-sectional segment is determined which may be impregnated without difficulty and which yields a uniform distribution of fibers. Thereafter, the sizes of the other cross sectional segments are determined. In each case the thickness of the outer segments is from 0.1 to 50 times that of the central cross-sectional segment which they surround.

If in a preliminary experiment a diameter of 11.5 mm is determined for the center segment, then the other cross sectional segments are obtained, for example by doubling, as follows:

|  | Diameter (mm) | Cross Section mm$^2$ |
|---|---|---|
| central segment | 11.5 | 103 |
| second segment | 16.1 | 205 |
| third segment | 25.5 | 509 |
| fourth segment | 36.0 | 1018 |
| fifth segment | 51.0 | 2036 |
| sixth segment | 72.0 | 4072 |

Doubling or an even greater multiplication of the areas of the cross-sectional segments is possible because the surface area of the segments increases strongly with rising diameter, and this increase in surface area significantly enhances the cooling effect. The segmental distribution of the overall cross section may be further affected by the reactivity of the impregnating resin, by the distance of the impregnating baths from each other, and/or by the drawing velocity.

The foregoing description has been set forth merely to illustrate the invention and is not intended to be limiting. Since modifications of the disclosed embodiments incorporating the spirit and substance of the invention may occur to persons skilled in the art, the scope of the invention is to be limited solely with respect to the appended claims and equivalents.

I claim:

1. A process for continuous production of shaped bodies of synthetic resin reinforced with axially parallel fibers substantially free of internal discharge promoting internal inhomogeneities and suitable for use as a high voltge electrical insulator comprising the steps of:
    drawing a plurality of individual fibers substantially vertically through spaced apertures in a perforated guide plate;
    drawing a first portion of said fibers vertically through a first means for impregnating fibers with a synthetic resin and impregnating said first fiber portion with a synthetic resin therein; said first impregnating means being heated to a uniform elevated temperature lying in the range from 30° to 180° C.;
    drawing the resin impregnated fibers vertically through a first nozzle to form the resin impregnated fiber portion to a desired first shape in which the resin is still liquid at the surface thereof;
    drawing the shaped body from the preceding nozzle and an additional portion of said fibers vertically through a further resin impregnating means heated to the same temperature as said first impregnating means and impregnating said additional fiber portion with a synthetic resin therein;
    drawing the shape and the resin impregnated additional fibers from said further impregnating means through a further nozzle to form the shaped body and the resin impregnated additional fiber portion to a further desired shape in which the resin is still liquid at the surface thereof;
    repeating the preceding two steps a selected number of times,
    continuously supplying preheated resin to each impregnating means; and
    drawing the desired shape from the final nozzle vertically through a hardening zone disposed immediately following the final nozzle and subjecting the shape to a distributed flow of hot air maintained at the same temperature as the resin impregnating means such that a uniform temperature corresponding to the temperature of the impregnating means is maintained throughout the entire vertical length of said hardening zone, and hardening the final shape in said hardening zone;
    said perforated guide plate, said resin impregnating means, said nozzles and said hardening zone being disposed in vertical arrangement;
    whereby the final fiber-reinforced shaped body is essentially free of bubbles, cracks and cavities which could promote internal discharge and has a substantially regular fiber distribution throughout with the reinforcing fibers being oriented axially parallel to each other and to the shaped body, and the shaped body is formed as a series of individually impregnated and successively assembled and hardened solid, cross-sectional segments beginning with a central core and proceeding to the outer surface.

2. A process according to claim 1, wherein the dimensions of successive cross-sectional segments are chosen such that the size of a cross-sectional segment which surrounds another cross-sectional segment is from 0.1 to 50 times the size of the surrounded cross-sectional segment.

3. A process according to claim 1, wherein each said impregnating means comprises a funnel-shaped impregnating bath with the fibers entering the bath through the larger opening of the funnel and the fiber-reinforced, shaped synthetic resin body exiting from the impregnating bath through a shaping nozzle which comprises the smaller opening of the funnel.

4. A process according to claim 1, wherein said perforated guide plate distributes the fibers entering said impregnating means according to an arrangement corresponding to the cross-sectional configuration of the shaped body to be formed.

5. A process according to claim 1, wherein successive impregnating means are spaced from 200 mm to 2000 mm from each other.

6. A process according to claim 1, wherein each impregnating means is provided at its upper margin with an inclined surface onto which drops of impregnating resin are continuously deposited.

7. A process according to claim 1, wherein said hardening zone comprises a hardening oven heated by hot air.

8. A process according to claim 1, wherein successive fiber portions are annularly arranged.

9. A process according to claim 1, wherein said final shaped body has a circular cross-sectional configuration with a diameter greater than 3 cm.

10. A process according to claim 1, wherein the reinforcing fiber content of said shaped body is from 40 to 75 volume percent.

* * * * *